(12) United States Patent  
Fujita et al.

(10) Patent No.: US 7,095,154 B2
(45) Date of Patent: *Aug. 22, 2006

(54) GENERATOR MOTOR FOR VEHICLES

(75) Inventors: Masahiko Fujita, Tokyo (JP);
Haruyuki Kometani, Tokyo (JP);
Toshiyuki Yoshizawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/059,366

(22) Filed: Feb. 17, 2005

(65) Prior Publication Data

US 2005/0184617 A1 Aug. 25, 2005

(30) Foreign Application Priority Data

Feb. 19, 2004 (JP) ............................ P2004-042733

(51) Int. Cl.
*H02K 1/22* (2006.01)
*H02K 21/12* (2006.01)
(52) U.S. Cl. ................................ 310/263; 310/156.66
(58) Field of Classification Search ........... 310/156.08, 310/156.66–156.73, 263, 45
See application file for complete search history.

(56) References Cited

U.S. PATENT DOCUMENTS 4,959,577 A    9/1990   Radomski
6,201,335 B1 * 3/2001  Higashino et al. .......... 310/263
6,930,432 B1 * 8/2005  Maeda et al. ............... 310/263

FOREIGN PATENT DOCUMENTS

JP    10-004661 A    1/1998

* cited by examiner

*Primary Examiner*—Tran Nguyen
(74) *Attorney, Agent, or Firm*—Sughrue Mion, PLLC

(57) ABSTRACT

It is an object of the invention to obtain a generator motor for vehicles that can increase generated power or generated torque by a special positioning of permanent magnets in gaps between predetermined claw magnetic poles. The invention provides a generator motor for vehicles that includes a stator and a rotor provided rotatably within the inner periphery of the stator. The rotor includes: a pair of pole cores with plural claw magnetic poles formed on outer peripheral sides thereof, the plural claw magnetic poles of respective pole cores facing opposite to each other and meshing; plural permanent magnets that are arranged in the spaces between the claw magnetic poles adjacent to one another in the rotor circumferential direction; and a magnetic field coil that is mounted inside the pole cores. In the generator motor for vehicles, each permanent magnet02 is positioned toward one of the claw magnetic poles away from the center in the circumferential direction of the space between the claw magnetic poles.

12 Claims, 6 Drawing Sheets (a)

ROTATING DIRECTION (b)

ROTATING DIRECTION

GENERATOR MOTOR FOR VEHICLES

BACKGROUND OF THE INVENTION

1. Field of the Invention

The present invention relates to a generator motor for vehicles that is mounted on a vehicle and functions as a generator or a motor.

2. Description of the Related Art

Conventionally, it is known that one generator motor in a vehicle drives vehicle-mounted devices and as well performs such functions as generating power for battery charging at the time of engine start and idling stop. When a magnetic field rotor with a magnetic field coil wound around pole cores having claw magnetic poles is used in this generator motor for vehicles, there is known a technique for mounting permanent magnets between the claw magnetic poles neighboring one another along the periphery of the pole cores. The permanent magnets are polarized in a direction opposite to the direction of leakage flux between claw magnetic poles to reduce the leakage fluxes between the claw magnetic poles or relax magnetic saturation due to the magnetic field main magnetic flux. Magnetic fluxes are interlinked with a stator core to increase effective magnetic flux which contributes to power generation or torque generation, whereby output of the generator and the motor is improved.

As an AC generator using permanent magnets, for example, JP-A-10-4661 (page 2, FIGS. 1 to 3) discloses an AC generator that includes a magnetic field coil for exciting a core of a rotor, plural magnets disposed in the core independent from one another, and magnet holding members that connect the plural magnets and are mounted together with the magnets. A molded product made from a nonmagnetic substance, resin, or the like is used as the magnet holding members.

Improvement of generated torque is desired in a generator motor for vehicles. In particular, in a generator motor for vehicles for providing an idle stop function, it is necessary to increase generated torque for engine start, that is, starting torque for a motor. In addition, recently, in the generator motor for vehicles, it is also necessary to increase output of power generation because of the increase in the number of electric devices mounted on a vehicle. In a generator motor having permanent magnets in a rotor, generated torque and amount of power generation increase if the volume of the permanent magnets (magnet power) is increased. However, the permanent magnets are expensive and it is likely that centrifugal force in high-speed rotation of the rotor increases and the permanent magnets scatter when the volume of the permanent magnets increase. Thus, it is desirable that output is improved without increasing the volume of the permanent magnets.

In the conventional technique described above, since the plural permanent magnets are connected and held by holding members to be mounted among the claw magnetic poles, there is the advantage that workability in mounting the permanent magnets is improved and the permanent magnets can be held surely. However, since the permanent magnets are closely mounted in magnet holding sections of the holding members provided among the claw magnetic poles, there is no room for trying new arrangements of the permanent magnets. In addition, since there is no space between the claw magnetic poles and the permanent magnets, it is likely that problems occur because stress is caused by temperature changes due to the difference in thermal expansion of the claw magnetic poles and of the permanent magnets.

SUMMARY OF THE INVENTION

The invention has been devised in order to solve the problems described above. It is an object of the invention to provide a generator motor for vehicles that can increase generation of electric power or torque without increasing the volume of permanent magnets which are used in the generator motors, by making new arrangements of the permanent magnets in the spaces between predetermined claw magnetic poles.

The generator motor for vehicles in the present invention includes a stator coil wound around an annular stator core and a rotor provided rotatably within the inner periphery of the stator, the rotor including: a pair of pole cores with plural claw magnetic poles meshed together on the outer periphery, the claw magnetic poles of respective pole cores facing opposite to each other and meshing together; plural permanent magnets that along the periphery of the pole cores; and a magnetic field coil that is mounted inside the pole cores, wherein each permanent magnet is located toward one of the claw magnetic poles away from the center in the circumferential direction of the space between the claw magnetic poles.

According to the generator motor for vehicles in the invention, since each permanent magnet, which is arranged between the claw magnetic poles of the rotor, is located toward one of the claw magnetic poles away from the center in the circumferential direction of the space between the claw magnetic poles, it is possible to increase generated electric power or generated torque.

The foregoing and other objects, features, aspects, and advantages of the invention will become more apparent from the following detailed description of the invention when taken in conjunction with the accompanying drawings.

DETAILED DESCRIPTION OF THE INVENTION

FIRST EMBODIMENT

Figure 1:
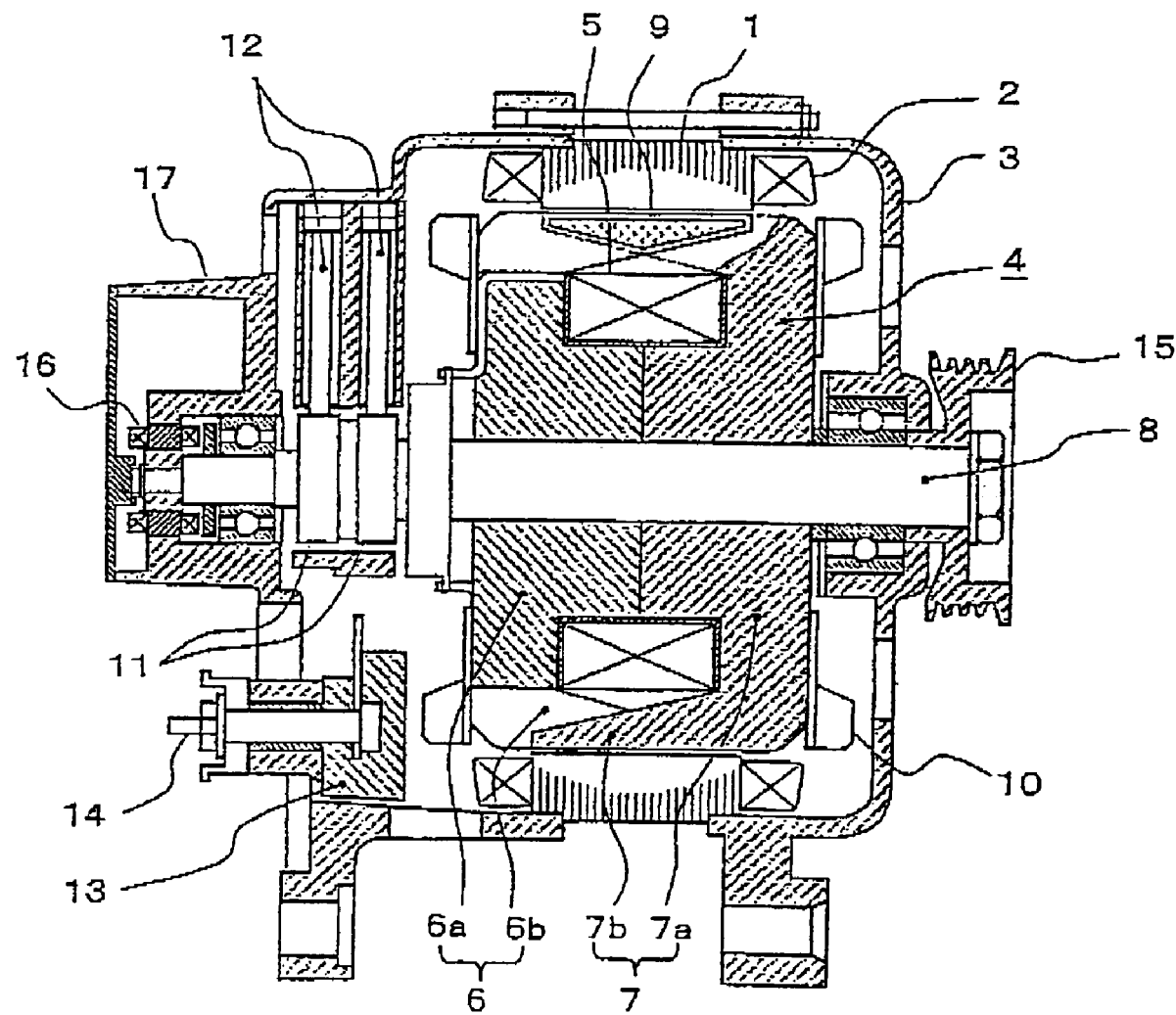
FIG. 1 is a sectional view showing a generator motor for vehicles according to a first embodiment of the invention.
Figure 2:
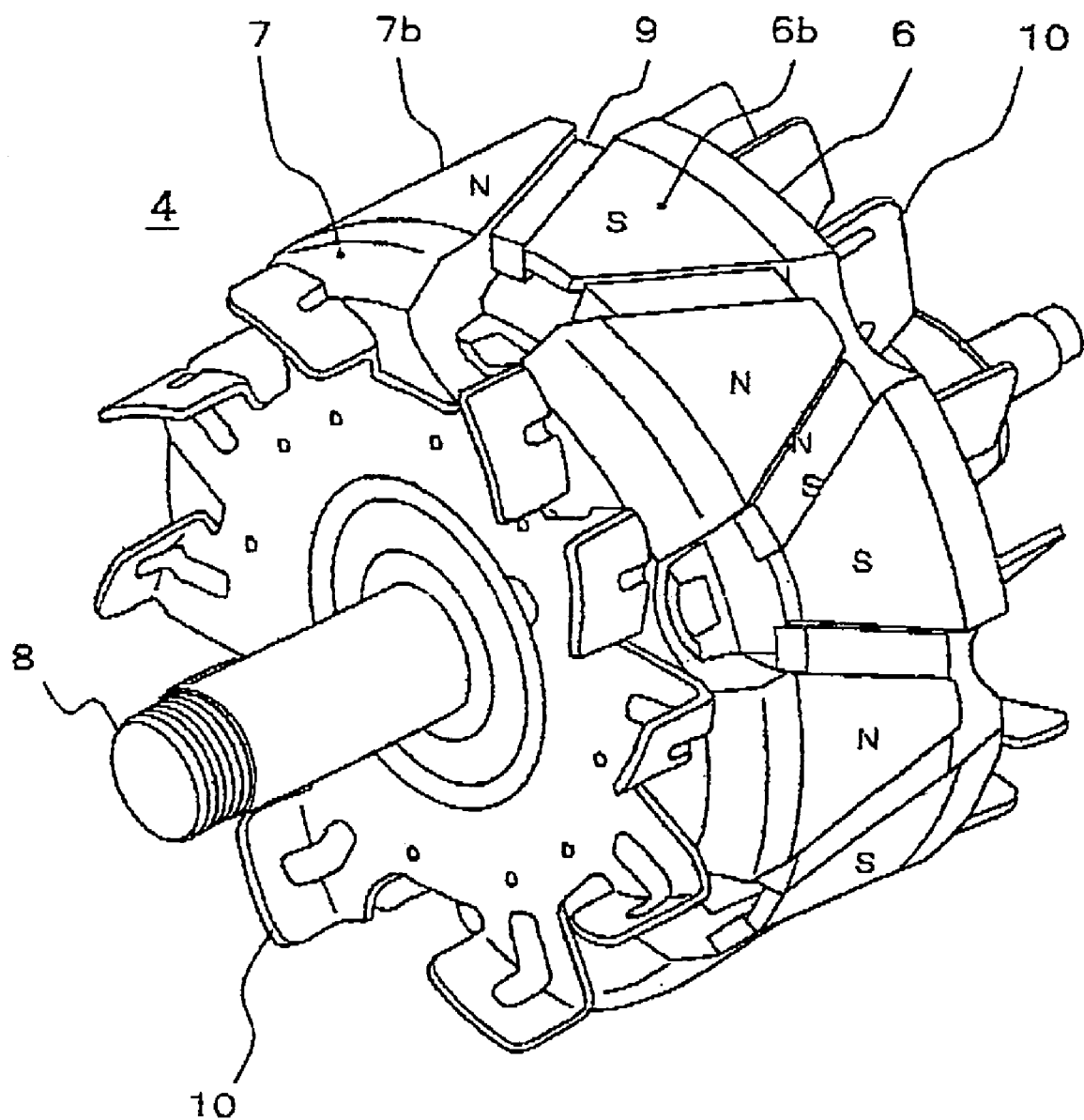
FIG. 2 is a perspective view showing a rotor of the generator motor for vehicles in FIG. 1.

FIG. 1 is a sectional view showing a generator motor for vehicles according to a first embodiment of the invention and FIG. 2 is a perspective view showing a rotor of the generator motor for vehicles. As shown in the figure, in the generator motor for vehicles, a stator, which has an annular stator core 1 provided with a slot on an inner side thereof and a stator winding 2 amounted in the slot, is fastened to an inner wall surface of a housing 3. In addition, a rotor 4 is supported rotatably by the housing 3 within the inner periphery of the stator.

The rotor 4 includes a magnetic field coil 5 and a pair of pole cores 6 and 7. The magnetic field coil 5 is wound around a bobbin made of resin and is fed an electric current to generate magnetic fluxes. The pair of pole cores 6 and 7 are provided to cover the magnetic field coil 5. In the pole cores 6 and 7, magnetic poles are formed by the magnetic fluxes generated by the magnetic field coils 5. The pole cores 6 and 7 include cylindrical bases 6a and 7a in which center holes are drilled and plural claw magnetic poles 6b and 7b provided at predetermined pitches along the outer periphery of the bases 6a and 7a. The respective claw magnetic poles 6b and 7b are formed in a trapezoid shape tapering in the direction of the axle. The pair of pole cores 6 and 7 are integrated with each other by butting end faces of the bases 6a and 7a against each other when the bases 6a and 7a are pressed into a shaft 8, so that the claw magnetic poles 6b and 7b mesh with each other. A permanent magnet 9 is oriented in the direction in which magnetic fluxes leaking between the claw magnetic poles 6b and 7b are reduced, and mounted in a space between the claw magnetic poles 6b and 7b adjacent to each other in the peripheral direction. A cooling fan 10 is fastened on an outer side in the axial direction of the pole cores 6 and 7. Two slip rings 11, which feed an electric current to the magnetic field coil 5, are provided in the shaft 8. The components 5 to 11 described above constitute the rotor 4.

When this rotor 4 is viewed from the outside, as shown in FIG. 2, the claw magnetic poles 6b and 7b are arranged at predetermined pitches alternately around the outer periphery of the rotor 4. The permanent magnets 9 are mounted in the spaces between the claw magnetic poles 6b and 7b.

Referring back to FIG. 1, a pair of brushes 12 are disposed to be in sliding contact with the slip rings 11 in the housing 3. The housing 3 also includes a wiring board 13 electrically connected to the brushes 12. A terminal base 14 provided to pierce through the housing 3 is electrically connected to the wiring board 13 and the stator winding 2. The outer end of the terminal base 14 is connected to a DC/AC bidirectional power converter (not shown).

A pulley 15, on which is fitted a timing belt (not shown), is fastened to one end of the shaft 8 and a sensor 16 is provided on the other end side of the shaft 8. The sensor 16 is housed in a hood 17 provided in the housing 3.

In the generator motor for vehicles constituted as described above, for example, when the generator motor for vehicles is used as a generator, an electric current is fed from a battery (not shown) to the magnetic field coil 5 via the brushes 12 and the slip rings 11 to generate magnetic fluxes. The claw magnetic pole of one of the pair of pole cores 6 and 7 is magnetized to be an N pole and the claw magnetic pole of the other pole core is magnetized to be an S pole by the magnetic fluxes. Conversely, rotation torque from the outside provided by an engine or the like is transmitted to the shaft 8 via the timing belt (not shown) and the pulley 15 to rotate the rotor 4. As a result, a rotating field is exposed to the stator winding 2 to generate an AC electromotive force. This AC electromotive force is led out to the outside via the terminal block 14

In this case, much of the magnetic flux generated in the magnetic field coil 5 enters the stator core 1 from the claw magnetic pole 7b of one pole core polarized to be the N pole (e.g., the pole core 7b). Then, the magnetic flux passes through the inside of the stator core 1, enters the inner portion of the pole core 6 polarized to be the S pole from the claw magnetic pole 6b thereof, and enters the stator core 1 again from the claw magnetic pole 7b of the pole core 7. In this way, a closed circuit is formed. Since magnetic fluxes leaking between the claw magnetic poles 6b and 7b are reduced by the permanent magnet 9, ineffective magnetic fluxes not contributing to power generation are reduced to improve power generation efficiency.

Figure 3:
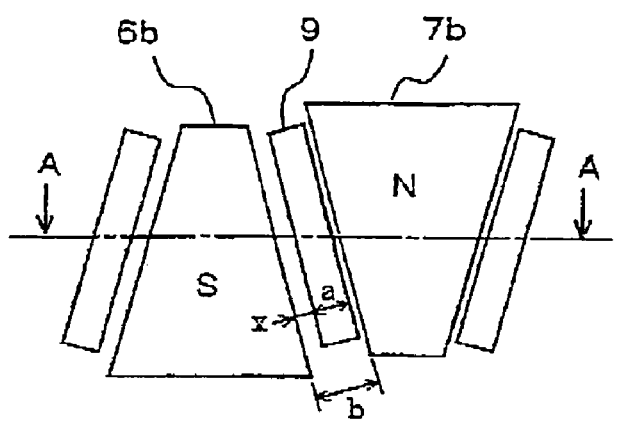
FIGS. 3A and 3B are diagrams showing arrangement of permanent magnets provided in the rotor of the generator motor for vehicles according to the first embodiment.
Figure 3:
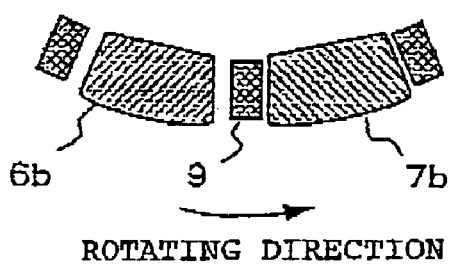

The first embodiment of the invention is characterized by the positioning of the permanent magnets 9. FIGS. 3A and 3B are diagrams showing positioning of permanent magnets provided in the rotor of the generator motor for vehicles according to the first embodiment. FIG. 3A is a plan view of the permanent magnets provided in the rotor and FIG. 3B is a sectional view along line A—A in FIG. 3A. As shown in the figures, the permanent magnet 9 in the space between the claw magnetic poles 6b and 7b is positioned toward one of the claw magnetic poles away from the center in the circumferential direction of the space between the claw magnetic poles. In other words, the permanent magnet 9 is arranged such that the gap between the permanent magnet 9 and the claw magnetic pole 6b and the thin gap between the permanent magnet 9 and the claw magnetic pole 7b are asymmetric. In the figures, the permanent magnet 9 is biased toward the claw magnetic pole 7b magnetized to the N pole. However, the permanent magnets may be arranged to be biased to either of the claw magnetic poles and do not always have to be arranged to be biased to the same magnetic poles. The permanent magnets may be arranged to be biased to the N pole and the S pole alternately. In addition, the permanent magnets may be arranged to be biased to the claw magnetic poles on the same side as the rotating direction or on the side opposite to the rotating direction.

It is necessary to set the width (dimension in the rotor circumferential direction) of the permanent magnet 9 to be narrower than the space between the claw magnetic poles 6b and 7b, allowing work space for holding and fixing the permanent magnet 9, space for cooling, and the like. The difference between the width of the permanent magnet 9 and the space between the claw magnetic poles 6b and 7b is equivalent to the fine gaps described above.

Figure 4:
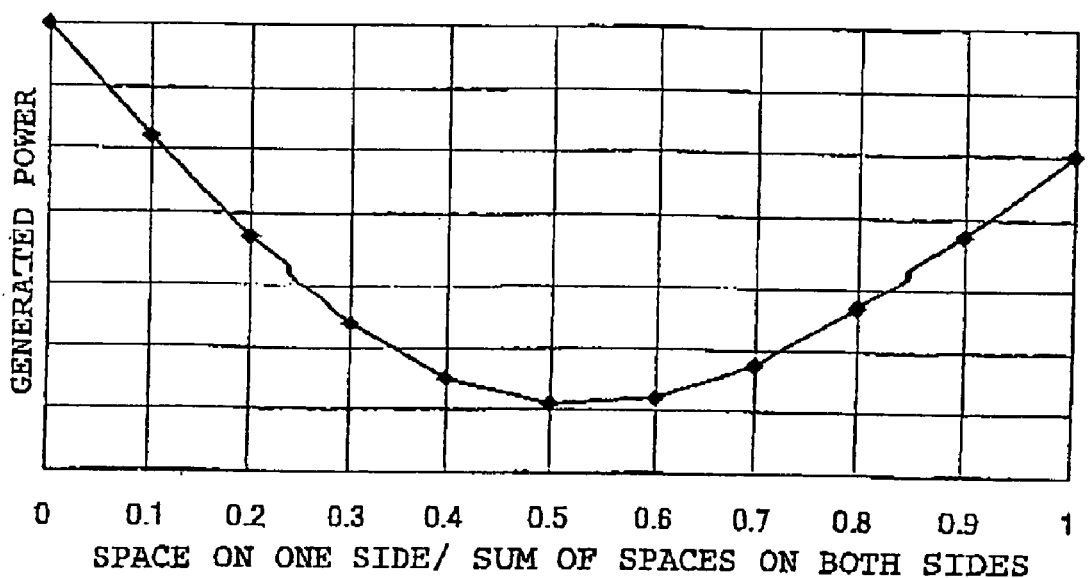
FIG. 4 is a graph showing the relation of position between claw magnetic poles of the permanent magnet provided in the rotor to electric power generated by the generator motor for vehicles according to the first embodiment.

The action of the generator motor for vehicles will be hereinafter explained. FIG. 4 is a graph showing the relation of position between claw magnetic poles of a permanent magnet to generated power, obtained by a three-dimensional field analysis, in the case in which the generator motor for vehicles is used as a generator. The vertical axis indicates the generated power and a horizontal axis indicates a ratio of the space on one side to the sum of spaces on both sides. The "space on one side" means a distance from one of the claw magnetic poles to the permanent magnet 9. Referring to FIG. 3A, when the width of the permanent magnet 9 is set as "a", the space between the claw magnetic poles 6b and 7b is set as "b", and the space between the claw magnetic pole 6b and the permanent magnet 9 is set as "x", the "space on one side" is "x" and the "sum of spaces on both sides" is "(b−a)" the right side of the claw magnetic pole 6b set as an origin. Therefore, the horizontal axis represents x/(b−a). When the permanent magnet 9 is arranged exactly in the center between the claw magnetic poles 6b and 7b, since the "space on one side" x is half the "sum of spaces on both sides" (b−a), the value on the horizontal axis is 0.5. When the permanent magnet 9 is biased completely to the claw magnetic pole 6b, since x is 0, a value on the horizontal axis is 0. When the permanent magnet is biased completely to the claw magnetic pole 7b, since x is equal to (b−a), the value on the horizontal axis is 1. Generated power at various positions of the permanent magnet 9 is found by reading the height of the line corresponding to the value on the horizontal axis. As it is evident from the graph, the generated power is lowest when the permanent magnet 9 is located in the center between the claw magnetic poles 6b and 7b and increases as the permanent magnet 9 is arranged to be biased to either the claw magnetic pole on the left or that on the right of the permanent magnet 9. Note that ratios between values of generated power are indicated in a magnified scale in order to facilitate understanding. It is seen from the above that it is effective to arrange the permanent magnet 9 to be shifted from the center of the space between the claw magnetic poles 6b and 7b, biased toward one of the claw magnetic poles 6b or 7b.

In FIGS. 3A and 3B, the permanent magnet is biased toward one of the claw magnetic poles in the space between the claw magnetic poles. In such an arrangement, since an air layer is present between both sides of the permanent magnet and the claw magnetic poles, this air layer contributes to cooling. Thus, it is possible to reduce increase in temperature of the permanent magnet at the time of driving. From the viewpoint of cooling, it is desirable that the air layer is present on both the sides of the permanent magnet. However, as it is seen from FIG. 4, generated power is larger when the permanent magnet is biased toward and brought into abutment against one of the claw magnetic poles.

Figure 5:
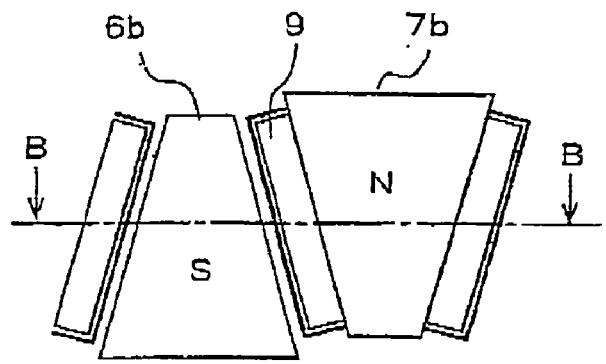
FIGS. 5A and 5B are diagrams showing another example of arrangement of the permanent magnets provided in the rotor of the generator motor for vehicles according to the first embodiment.
Figure 5:
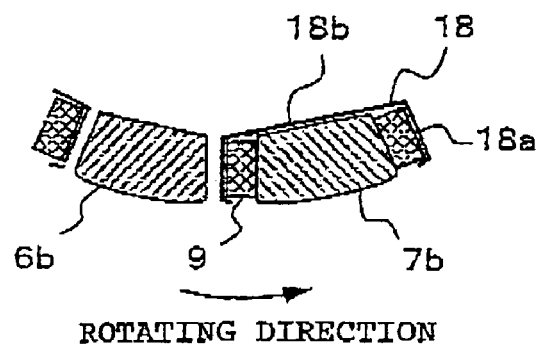

FIGS. 5A and 5B are diagrams showing another example of arrangement of the permanent magnets provided in the rotor of the generator motor for vehicles according to the first embodiment. FIG. 5A is a plan view of the permanent magnets provided in the rotor and FIG. 5B is a sectional view along line B—B in FIG. 5A. The permanent magnets 9 are biased toward and brought into abutment against the claw magnetic pole 7b. A holding member 18 for holding the permanent magnets 9 is formed by folding both ends of a thin plate of stainless steel or the like in a C shape, respectively. The holding member 18 with an open square shape has flap portions 18a and a flat portion 18b. In attaching the permanent magnets 9 to the holding member 18, first, the permanent magnets 9 are fixed to the vane portions 18a with an adhesive and, then, the adhesive is applied to the flat portion 18b to fasten the flat portion 18b to the rear surface of the claw magnetic pole 7b.

The positions along the rotor circumference where the permanent magnets 9 are brought into abutment may be both sides of the S pole instead of both sides of the N pole shown in the figures. Alternatively, the permanent magnets 9 may be brought into abutment against only one side of the N pole and one side of the S pole, respectively. However, when the permanent magnets 9 are brought into abutment against both sides of a claw magnetic pole of one pole core as shown in FIGS. 5A and 5B, a holding member 18 need only be attached to the claw magnetic pole of one of the two pole cores. Thus, attachment work is simplified.

Note that a holding member is not shown in FIGS. 3A and 3B. However, if the holding member 18 is provided in FIGS. 3A and 3B, the flat portion 18b only has to be slightly longer than that shown in FIGS. 5A and 5B.

The permanent magnets 9 may be adhered and fastened to the claw magnetic pole directly with an adhesive without providing the holding member 18.

In the above description, the air layer is present on both sides or one side of the permanent magnets. If the air layer is present, a cooling effect can be expected. However, a centrifugal force increases as the rotor rotates at high speed, exerting vibration on the permanent magnets. It is also possible that because the magnetic attraction force generated between the stator core and the claw magnetic pole changes continuously during operation, the magnetic attraction force acts on the claw magnetic pole as a fluctuating force to cause vibration or noise. Therefore, a method of holding the permanent magnets with more importance attached to vibration control than cooling will be explained.

Figure 6:
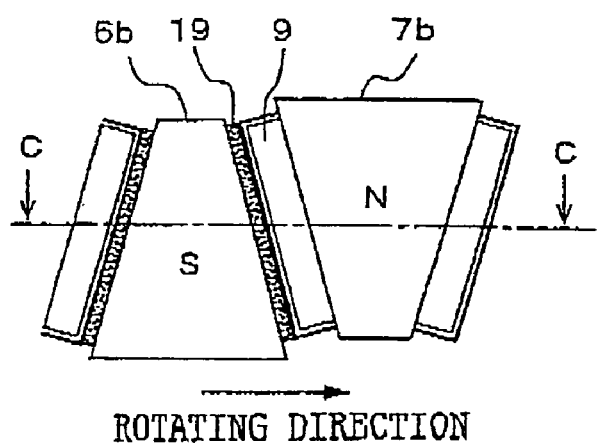
FIGS. 6A and 6B are diagrams showing still another example of arrangement of the permanent magnets provided in the rotor of the generator motor for vehicles according to the first embodiment.
Figure 6:
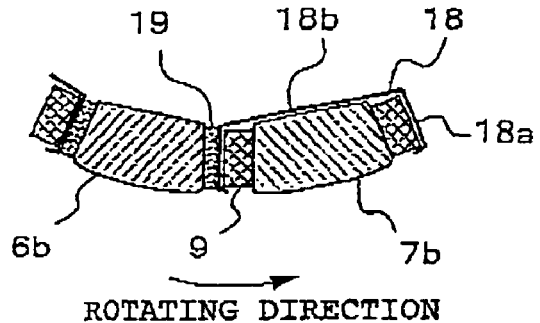

FIGS. 6A and 6B are diagrams showing still another example of arrangement of the permanent magnets provided in the rotor of the generator motor for vehicles according to the first embodiment. FIG. 6A is a plan view of the permanent magnets provided in the rotor and FIG. 6B is a sectional view along line C—C in FIG. 6A. As shown in the figures, resin layers 19 are interposed in the larger of the gaps formed between the permanent magnets and claw magnetic poles. Note that, when the permanent magnets are brought into contact with the claw magnetic poles, the smaller gaps are not left. The resin layers 19 are made of epoxy resin or the like. To interpose the resin layers 19 only a method such as filling the resin in the gaps, applying the resin on the permanent magnets and inserting the permanent magnets among the claw magnetic poles, or sticking a resin sheet on the permanent magnets and mounting the permanent magnets need be employed. Note that, in the figures, the resin layers 19 are used together with the holding member 18. However, only the resin layer 19 need be used. The positions of the permanent magnets 19 in the circumferential direction are the same as those shown in FIG. 5 but are not limited to these positions.

Figure 7:
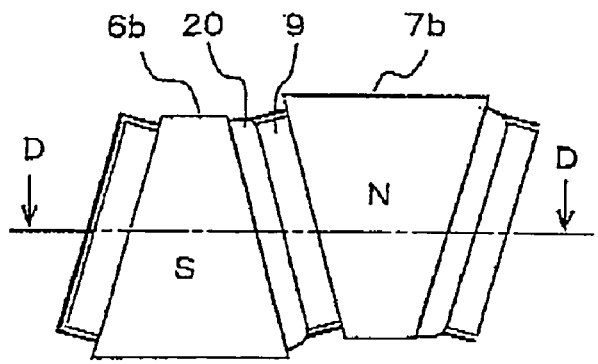
FIGS. 7A and 7B are diagrams showing a method of holding the permanent magnets provided in the rotor of the generator motor for vehicles according to the first embodiment.
Figure 7:
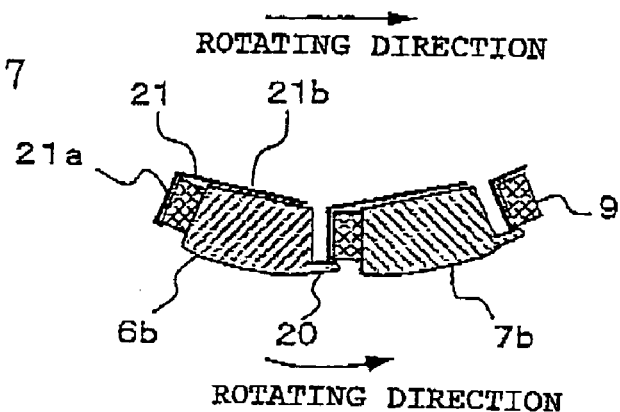

A method of holding permanent magnets which prevents vibration of the permanent magnets will here be explained. FIGS. 7A and 7B are diagrams showing a method of holding the permanent magnets of the rotor. FIG. 7A is a plan view of the permanent magnets of the rotor and FIG. 7B is a sectional view along line D—D in FIG. 7A. As shown in the figures, collar portions 20, which prevent the permanent magnets 9 from moving in the rotor radial direction, are provided at least on one side of the claw magnetic poles. The permanent magnets are also held by holding members 21. In the holding members 21, flap portions 21a are formed by folding a thin plate of stainless steel or the like at two places in the same direction to form an open square shape. The permanent magnets 9 are inserted in the flap portions 21a and fixed with an adhesive. The adhesive is also applied to flat portions 21b in the center of the C shape to fasten the holding members 21 to the rear surfaces of the claw magnetic poles 6b and 7b. As a result, it is possible to prevent the permanent magnets 9 from being moved in the radial direction by the centrifugal force at the time of operation.

Note that the permanent magnets 9 may be fastened to the sides of the claw magnetic poles with the adhesive without providing the holding member 21. In addition, the positions of the permanent magnets 19 in the circumferential direction are the same as those shown in FIG. 5, but positions are not limited to these.

As described above, according to the embodiment of the invention, the permanent magnet, which is mounted in the space formed between the claw magnetic poles of the rotor, biased toward one of the adjacent claw magnetic poles away from the center of the space in the circumferential direction. Thus, when the generator motor is used as a generator, it is possible to increase effective magnetic fluxes at the time of power generation, and power output is improved.

The surface on one side of the permanent magnet is brought into abutment against the side of either of the adjacent claw magnetic poles. Thus, when the generator motor is used as a generator, it is possible have the optimum arrangement of the permanent magnet in the space of the predetermined claw magnetic poles to maximize power output.

Since the permanent magnets are brought into abutment against both the sides of one pole core and are not abutted against the neighboring pole core, the permanent magnets only have to be mounted on one of every two pole cores. Thus, in assembly of the generator motor the magnet mounting process is simplified and workability is improved. In addition, it is possible to reduce cost because the number of holding members can be reduced.

Since the permanent magnets are fastened to the claw magnetic poles by the holding members, it is possible to hold the permanent magnets surely and prevent scattering of magnets due to the centrifugal force arising when the rotor is driven at high speed.

Since the larger gap of the gaps formed between the claw magnetic pole and the permanent magnet is kept an air layer, the heat radiation area of the permanent magnet increases and flow of the air through the gap is enabled. Thus, it is possible to control increase in temperature of the claw magnetic pole and the permanent magnet. If consequently the temperature gradient of the amount of magnetic fluxes of the permanent magnet is negative, improvement of output through a reduction in temperature can also be expected. In addition, it is also possible to prevent irreversible demagnetization due to an increase in temperature of the permanent magnet. Moreover, since temperature of the whole pole core can be reduced, it is possible to prevent thermal damage to the resin material used in a bobbin for winding a magnetic field coil.

Since the resin layers are interposed in the larger of the gaps formed among the claw magnetic poles and the permanent magnets, the permanent magnets are fixed and it is possible to control vibration of the magnets when a vibration force is applied. Thus, it is possible to reduce noise.

Since the collar portions, which prevent movement of the permanent magnets to an outer diameter side of the claw magnetic poles, are provided in the claw magnetic poles, it is possible to prevent scattering of the permanent magnets due to centrifugal force generated when the rotor is rotated at high speed.

SECOND EMBODIMENT

Figure 8:
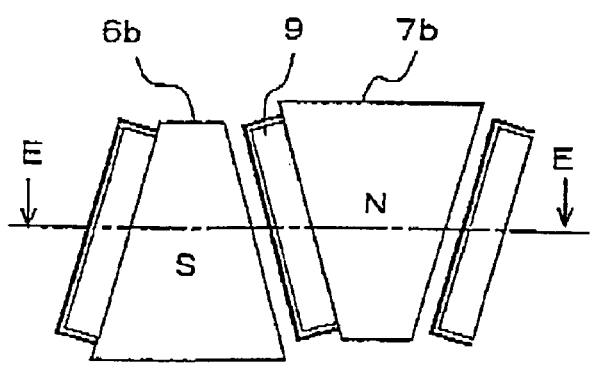
FIGS. 8A and 8B are diagrams showing arrangement of permanent magnets provided in a rotor of a generator motor for vehicles according to a second embodiment of the invention.
Figure 8:
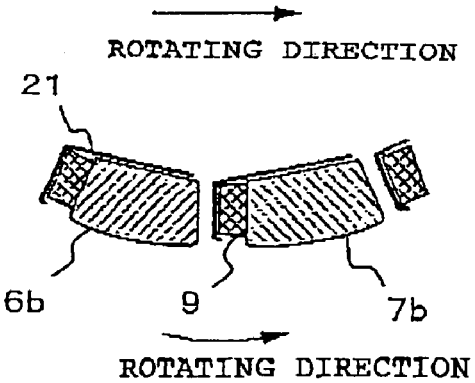

FIGS. 8A and 8B are diagrams showing an arrangement of permanent magnets provided in a rotor of a generator motor for vehicles according to a second embodiment of the invention. FIG. 8A is a plan view of the permanent magnets of the rotor and FIG. 8B is a sectional view along line E—E in FIG. 8A. The structure of the entire generator motor for vehicles is the same as that explained in the first embodiment and the structure of the rotor is the same as that shown in FIG. 2 in the first embodiment. Thus, explanations of components and operations of the generator motor for vehicles and the rotor are omitted. This embodiment is the configuration of an example in which the generator motor for vehicles is used as a motor. As in the first embodiment, the permanent magnet 9 is biased toward and brought into abutment against one claw magnetic pole away from the center of the space in the circumferential direction between the adjacent claw magnetic poles 6b and 7b. However, the embodiment is characterized in that there are special positions in the circumferential direction of the permanent magnets brought into abutment. It is assumed that the positions in the circumferential direction where the permanent magnets are brought into abutment are on the sides of the claw magnetic poles opposite to the rotating direction of the rotor. The holding members 21 are the same as those shown in FIG. 7 in the first embodiment.

Figure 9:
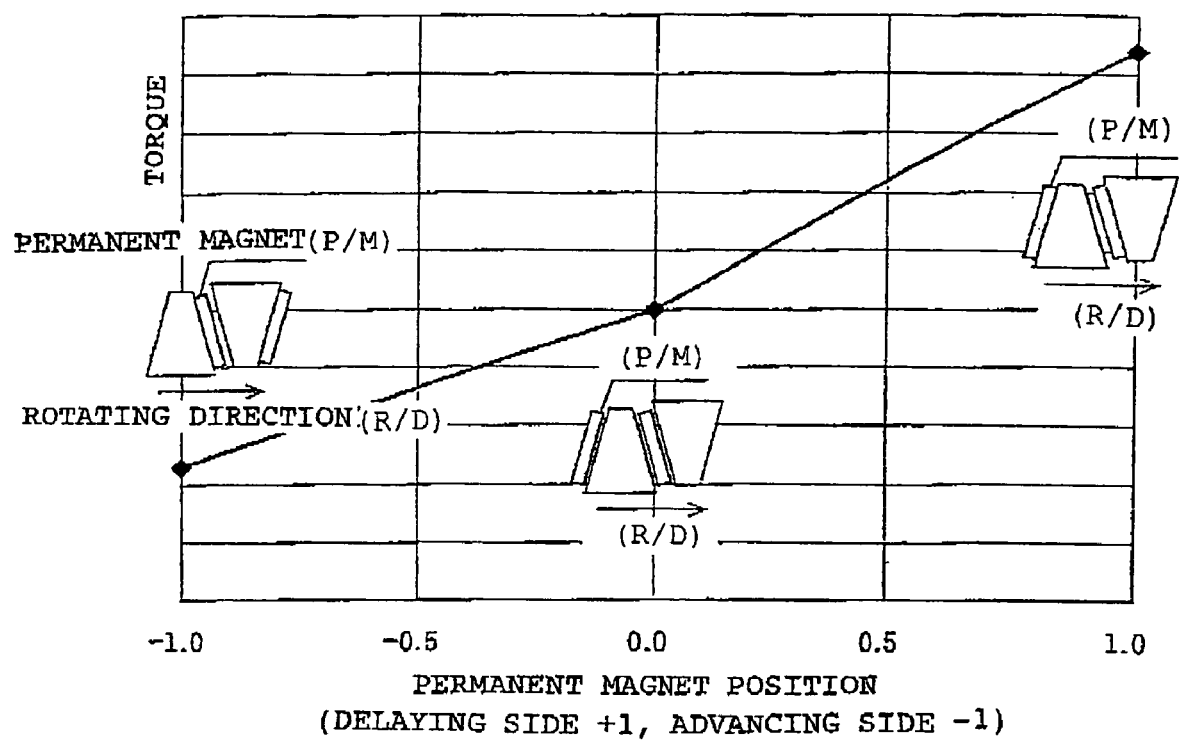
FIG. 9 is a graph showing the relation of torque to arrangement position of the permanent magnets of the generator motor for vehicles according to the second embodiment.

Next, the action of the generator motor for vehicles will be explained. FIG. 9 is a graph showing the dependence of torque on the position of a permanent magnet in the case in which the generator motor for vehicles is used as a motor, obtained by a three-dimensional field analysis. The vertical axis of the graph indicates torque. On the horizontal axis, 0 is set to be the permanent magnet in the center of the space between claw magnetic poles adjacent to each others in the circumferential direction. The permanent magnet position is represented by a larger negative number as the permanent magnet is biased in the rotating direction of the claw magnetic poles. (hereinafter referred to as "advancing side"). The permanent magnet position is set to −1 when the permanent magnet is brought into abutment against the pole on the advancing side. The permanent magnet position is represented by a larger positive number as the permanent magnet is biased opposite to the rotating direction of the claw magnetic poles (hereafter referred to as "delaying side"). The permanent magnet position is represented as 1 when the permanent magnet is brought into abutment against the pole on the delaying side. As it is evident from the figure, the torque is the largest when the permanent magnet 9 is brought into abutment against the pole on the delaying side of the claw magnetic poles. Thus, in this embodiment, as shown in FIGS. 8A and 8B, the permanent magnets 9 are mounted in abutment against the delay sides of the claw magnetic poles 6b and 7b.

As a method of holding the permanent magnets, as in the first embodiment, the method of holding the permanent magnets with holding members or sticking the permanent magnets on the claw magnetic poles with an adhesive is applied. In addition, collar portions, which prevent the permanent magnets from moving to the outer circumference of the rotor, may be provided in the claw magnetic poles. Moreover, as in the first embodiment, gaps between the permanent magnets and the claw magnetic poles may be left as an air layer when a cooling effect is desired, or a resin layer when importance is attached to prevention of vibration.

As described above, according to the embodiment of the invention, the positions where the permanent magnets are brought into abutment, are set to be the sides of the claw magnetic poles opposite to the rotating direction of the rotor.

Thus, it is possible to increase generated torque when the generator motor for vehicles is used as a motor.

While the presently preferred embodiments of the present invention have been shown and described. It is to be understood that these disclosures are for the purpose of illustration and that various changes and modifications may be made without departing from the scope of the invention as set forth in the appended claims.

What we claim is:

1. An electromagnetic machine for vehicles that includes a stator having a stator coil wound around an annular stator core and a rotor provided rotatably within the inner periphery of the stator, the rotor comprising:
    a pair of pole cores with plural claw magnetic poles formed on outer peripheral sides thereof, the plural claw magnetic poles of respective pole cores facing opposite to each other and meshing together;
    plural permanent magnets that are arranged in the spaces between the claw magnetic poles adjacent to one another in the rotor circumferential direction; and
    a magnetic field coil that is mounted inside the pole cores, wherein
    each permanent magnet is positioned toward one of the claw magnetic poles away from the center in the rotor circumferential direction of the space between the claw magnetic poles,
    wherein only one permanent magnet is disposed between each of said plural claw magnetic poles.

2. The electromagnetic machine according to claim 1, wherein the permanent magnets are brought into abutment against the claim magnetic poles at the sides to which the permanent magnets are biased.

3. The electromagnetic machine according to claim 2, wherein the positions in the circumferential direction where the permanent magnets are brought into abutment are the two sides of every other claw magnetic pole.

4. The electromagnetic machine according to claim 2, wherein the positions in the circumferential direction where the permanent magnets are brought into abutment are the sides of the claw magnetic poles opposite to the rotating direction of the rotor.

5. The electromagnetic machine according to claim 1, wherein the permanent magnets are held in the claw magnetic poles by holding members.

6. A generator motor for vehicles according to claim 1, wherein the larger of the two gaps formed between the two claw magnetic poles and the permanent magnet are kept air layers.

7. The electromagnetic machine according to claim 1, wherein resin layers are interposed in larger of the gaps formed between the claw two magnetic poles and the permanent magnet.

8. The electromagnetic machine according to claim 1, wherein collar portions, which prevent movement of the permanent magnets to the outer circumference of the rotor, are provided in the claw magnetic poles.

9. The electromagnetic machine according to claim 8, wherein said collar portions are extensions of said claw magnetic poles.

10. The electromagnetic machine according to claim 9, wherein said collar portions extend substantially perpendicular from a face of said claw magnetic poles.

11. The electromagnetic machine according to claim 8, wherein said collar portions are provided at a circumferential portion of said rotor.

12. The electromagnetic machine according to claim 1, wherein the permanent magnets are adhered directly to the claw magnetic poles.

* * * * *